US 6,641,034 B1

(12) United States Patent
Oki et al.

(10) Patent No.: US 6,641,034 B1
(45) Date of Patent: Nov. 4, 2003

(54) CARD READER WITH A LIGHT-EMITTING BEZEL

(75) Inventors: Hajime Oki, Arlington Heights, IL (US); Steve J. Lanovich, Evergreen Park, IL (US); Lucian Predescu, Chicago, IL (US); Junichi Yamamoto, Elk Grove, IL (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 331 days.

(21) Appl. No.: 09/637,989

(22) Filed: Aug. 11, 2000

(51) Int. Cl.$^7$ .................................................. G06K 5/00
(52) U.S. Cl. ........................ 235/380; 235/491; 463/29; 463/47
(58) Field of Search ................................ 235/491, 380, 235/382; 382/152; 463/29, 47

(56) References Cited

U.S. PATENT DOCUMENTS

| | | | |
|---|---|---|---|
| 3,614,430 A | * | 10/1971 | Berler .......................... 250/271 |
| 3,723,655 A | * | 3/1973 | Zucker et al. ................ 235/468 |
| 3,913,202 A | * | 10/1975 | Pyle et al. ..................... 29/721 |
| 4,138,195 A | * | 2/1979 | Saurer et al. ................... 349/69 |
| 4,649,264 A | * | 3/1987 | Carson ...................... 235/54 R |
| 5,005,873 A | * | 4/1991 | West ............................ 235/491 |
| 5,635,696 A | * | 6/1997 | Dabrowski .................. 194/206 |
| 5,655,961 A | | 8/1997 | Acres et al. |
| 5,702,304 A | | 12/1997 | Acres et al. |
| 5,741,183 A | | 4/1998 | Acres et al. |
| 5,752,882 A | | 5/1998 | Acres et al. |
| 5,820,459 A | | 10/1998 | Acres et al. |
| 5,836,817 A | | 11/1998 | Acres et al. |
| 5,854,542 A | | 12/1998 | Forbes |
| 5,876,284 A | | 3/1999 | Acres et al. |
| 5,919,422 A | * | 7/1999 | Yamanaka et al. ........... 422/121 |
| 5,955,835 A | * | 9/1999 | Oh et al. ...................... 313/503 |
| 5,959,281 A | | 9/1999 | Domiteaux |
| 5,959,531 A | | 9/1999 | Gallagher, III et al. |
| 6,008,784 A | | 12/1999 | Acres et al. |
| 6,043,615 A | | 3/2000 | Forbes |
| 6,047,966 A | * | 4/2000 | Hishinuma et al. ......... 273/143 R |
| 6,115,557 A | * | 9/2000 | Maeda et al. ................ 358/909.1 |
| 6,162,122 A | | 12/2000 | Acres et al. |
| 6,203,853 B1 | * | 3/2001 | Takamatsu et al. ....... 427/255.37 |
| 6,268,058 B1 | | 7/2001 | Tahon et al. |
| 6,280,797 B1 | * | 8/2001 | Kuczynski et al. ........... 427/226 |
| 6,296,188 B1 | | 10/2001 | Kiekhaefer |

\* cited by examiner

Primary Examiner—Karl D. Frech
Assistant Examiner—Kimberly Nguyen
(74) Attorney, Agent, or Firm—Brinks Hofer Gilson & Lione

(57) ABSTRACT

A card reader of the present invention is useful in a dimly lit light condition, such as in a casino. The card reader includes a front member or bezel made of a fluorescent plastic and a UV lamp for irradiating UV light to the front member. When exposed to UV light, the fluorescent plastic absorbs the UV light and emits light in the visible spectrum. The light emitted from the front member aids a card user in inserting a card into the slot of the card reader in a dimly lit light condition.

69 Claims, 6 Drawing Sheets

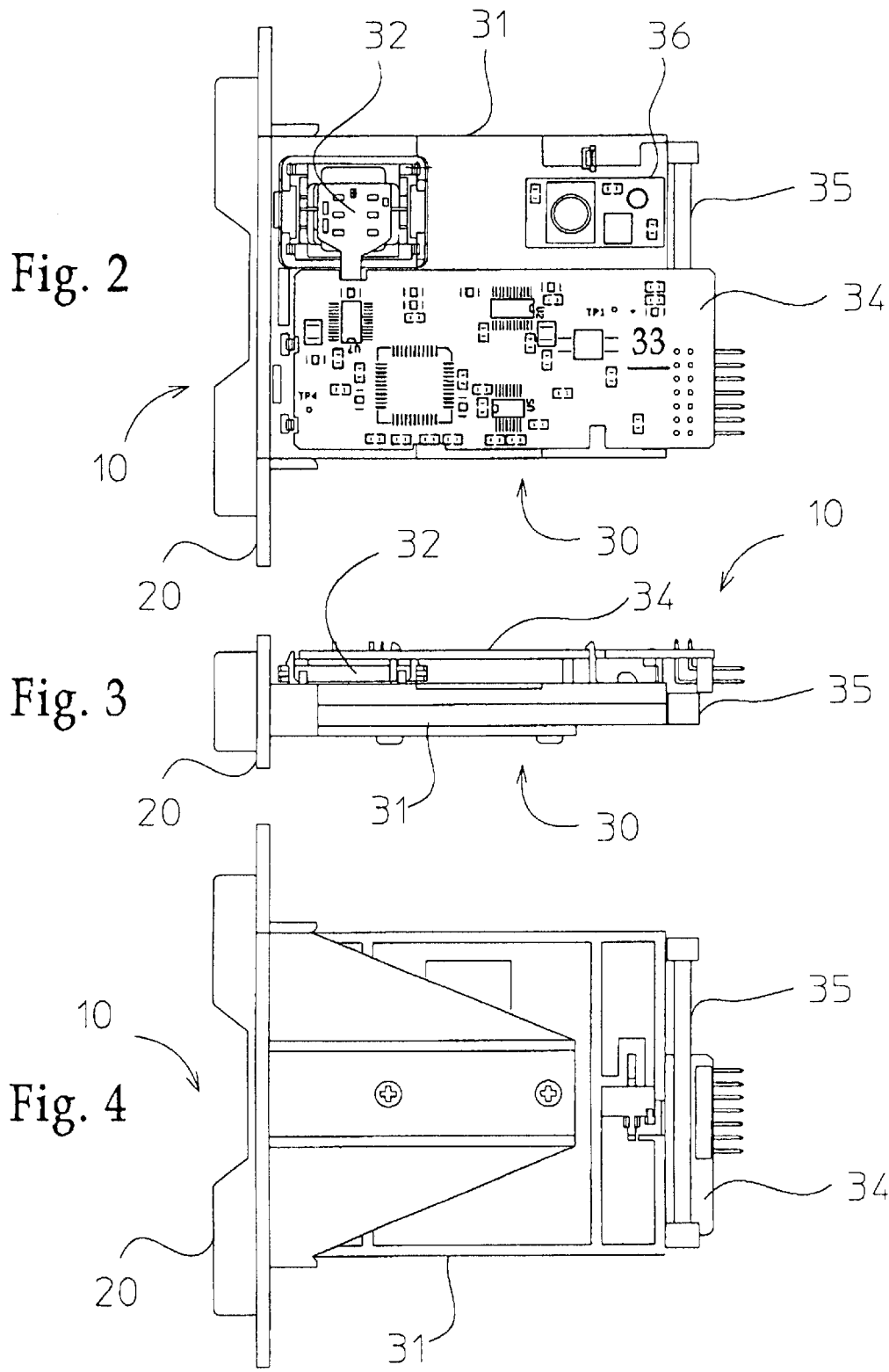

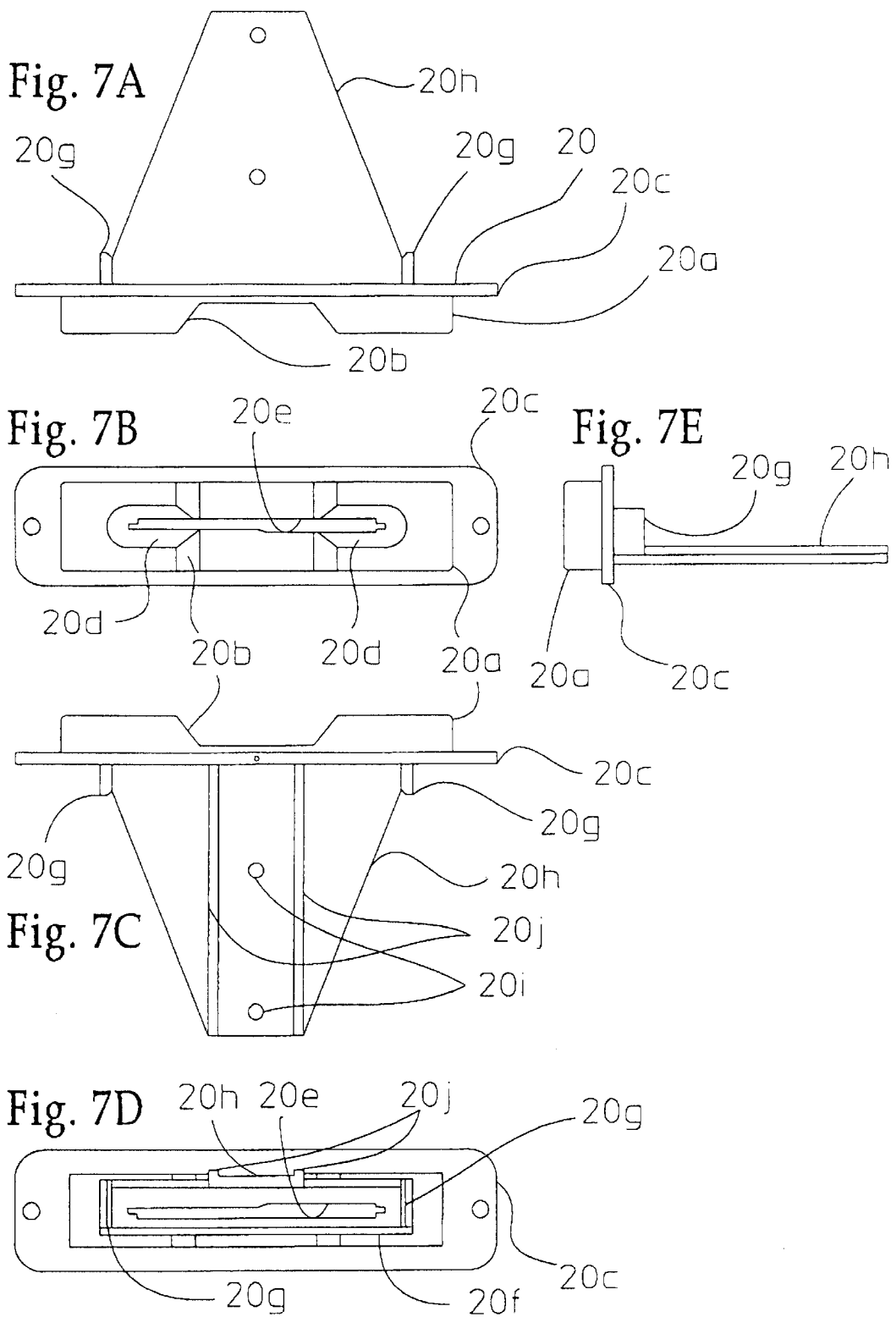

CARD READER WITH A LIGHT-EMITTING BEZEL

BACKGROUND OF THE INVENTION

This invention relates to a card reader for reading and writing data on cards, and specifically to a card reader that has a light-emitting bezel visible in all ambient light conditions. A bezel is a front cover attached to a card reader.

In these days, casinos are highly computerized. Gaming machines are connected to a host computer that monitors the usage of each gaming machine. Gaming tables and gaming machines are also provided with card readers. Each player is given an identification card encoded with an identification code unique to the player and, before playing a game, inserts the card into the card reader that is provided for the gaming machine the payer is about to play or the card reader that is provided in front of the player's seat at a gaming table.

Advantages of providing card readers for game tables and gaming machines are apparent. The identification code read by the card reader is sent from the gaming machine or table to the host computer, along with data indicating the player's gaming activities, such as the amount of money the player spent and the games the player played. The host computer tracks the player's gaming activities and makes a report that enables the casino to provide more individualized services to the player.

The card readers may eliminate the need to bring around cash, coins or tokens inside casinos. The player pays in advance for game plays. The amount of money the player paid is recorded on the player's account on the host computer. At each game play, the amount won is credited and the amount lost is debited on the player's account. Thus, the card readers allow players to enjoy games without using cash, coins or tokens.

Furthermore, although subject to regulatory approval, the player can enjoy games even without bothering to pay in advance for game plays, using the player's credit card. The player's credit card information is read by the card reader and sent to the host computer. At each game play, the host computer settles a transaction directly on the player's credit card account.

As discussed above, card readers can improve casinos' services and players' conveniences. But a problem has been pointed out with conventional card readers. Under a dimly lit condition inside casinos, conventional card readers, since usually coming with a black bezel, may not be so visible to players. Nothing is more frustrating than trying to find out something in the dark. As a result, the player sometimes begins playing a game without inserting the card into the card reader. The player, by doing so, foregoes conveniences the player is entitled to enjoy. This also eliminates opportunities for casinos to improve their services to the player.

BRIEF SUMMARY OF THE INVENTION

The purpose of this invention is to provide a card reader having a light-emitting bezel that can make the slot of the card reader visible in all ambient light conditions.

To this end, a card reader according to the present invention includes a front member attached to the card read/write device of the card reader and illuminating the slot. The front member may be a bezel having an elongated window through which the card is inserted into the slot.

In the present invention, the front member is made of a fluorescent plastic. The fluorescent plastic has a characteristic of absorbing UV light and emits light in the visible spectrum. The card reader may have a UV lamp for irradiating UV light to the front member. When exposed to the UV light, the fluorescent plastic emits visible light, which aids a cardholder in inserting the card into the slot of the card reader in a dimly lit light condition. The UV lamp may be turned on and off so that the front member will emit visually pleasing patterns of light.

An arrangement is possible in which the front member is made of the fluorescent plastic, and the casing of the card read/write device is made of a transparent plastic. In such an arrangement, through the transparent casing, the front member is irradiated uniformly by the UV light from the UV lamp.

The fluorescent plastic may be colored in a desired color to make the front member look attractive. An arrangement is also possible in which the front member is made of the fluorescent plastic of one color and the casing of the card read/write device is made of the fluorescent plastic of a different color. In such an arrangement, the front member emits light in mixed colors that make the front member look aesthetically pleasing. The front member may be made of a plurality of fluorescent plastics of different colors to emit light in visually attractive coloration.

Such a fluorescent plastic may also be used for the front member that has a characteristic of colleting ambient light and emitting the collected light or characteristic of storing light in a bright light condition and emitting the stored light in a dark condition.

The front member may not be made of the fluorescent plastic if the card reader has a light source that emits visible light. The light source may be an electro luminescent film that emits light when a voltage is applied thereto. The light source may be at least one LED capable of emitting light in different colors. The at least one LED may be switched in different colors to emit visually attracting patterns of light. If the casing of the card read/write device is made of a fluorescent plastic, the casing may become the light source by irradiating UV light to the casing.

In order to protect electronics components of a gaming machine from being damaged by static electricity built up on players, it is preferable that the front member contains a conductive material that can discharge static electricity through the card to ground.

Lastly, the card is selected from the group consisting of a magnetic card, IC card, smart card, credit card and debit card.

BRIEF DESCRIPTION OF SEVERAL VIEWS OF THE DRAWINGS

FIG. 2 is a top view showing a card reader of an embodiment according to the present invention;

FIG. 3 is a side view showing the same card reader;

FIG. 4 is a bottom view showing the same card reader;

FIG. 7A is a top view showing a bezel of an embodiment according to the present invention;

FIG. 7B is a front view showing the same bezel;

FIG. 7C is a bottom view showing the same bezel;

FIG. 7D is a rear view showing the same bezel;

FIG. 7E is a side view showing the same bezel;

DETAILED DESCRIPTION OF THE INVENTION

Figure 1:
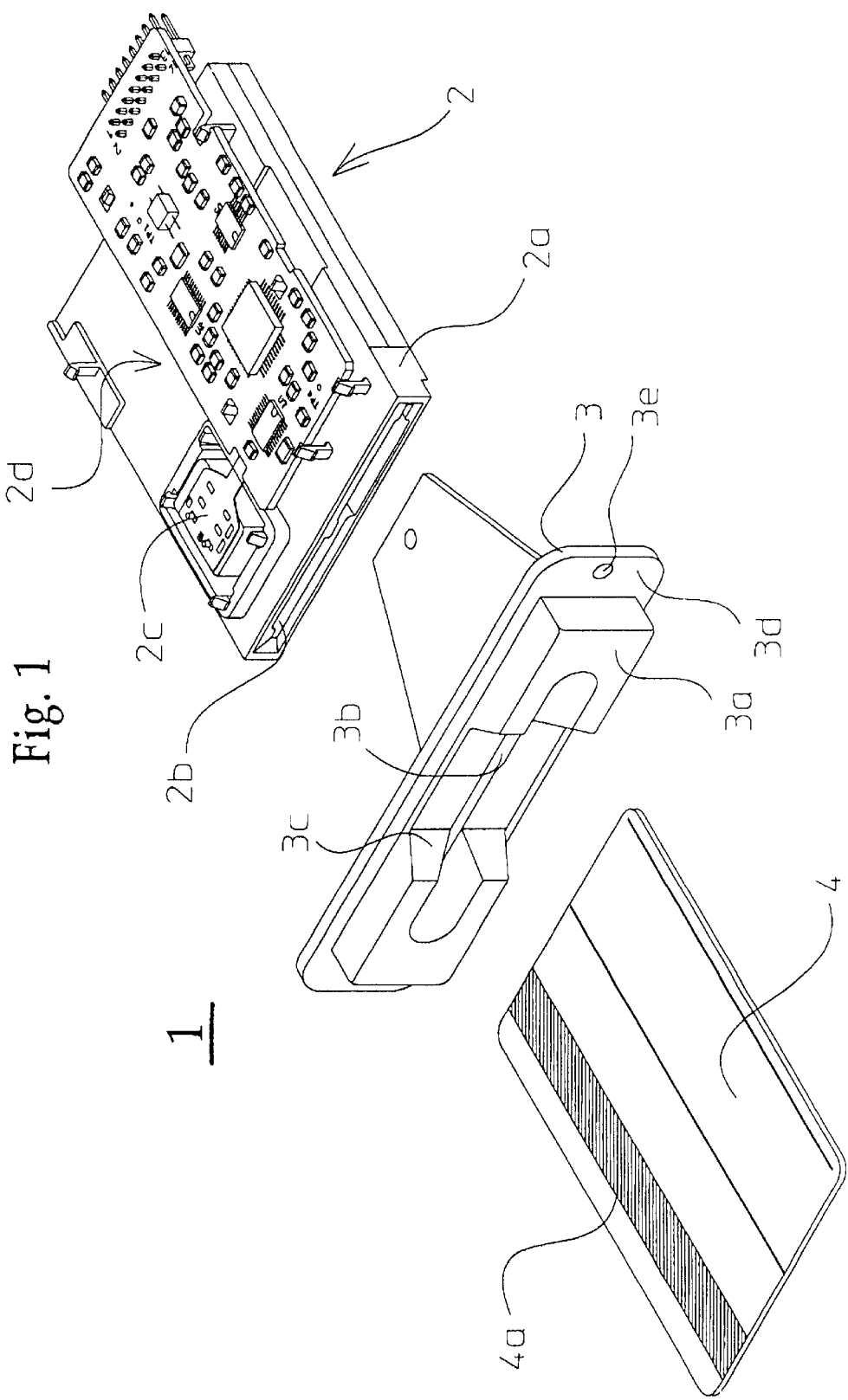
FIG. 1 is a perspective view showing a conventional card reader.

FIG. 1 shows a conventional card reader 1 for use with a gaming machine, such as a slot machine. As shown in FIG. 1, the conventional card reader 1 includes a card read/write device 2 and a bezel 3. The card read/write device 2 includes a flat rectangular casing 2a. The casing 2a of the card read/write device 2 has in its front surface a slot 2b through which a card 4 is insertable into the casing 2a. The card read/write device 2 has a magnetic head 2c and its control circuit 2d and is capable of reading and writing data along a magnetic strip 4a formed on the rear surface of the card 4.

The bezel 3 is made of a molded plastic that is usually black and opaque, and secured to the front end of the casing 2a. As shown in FIG. 1, the bezel 3 has a rectangular elevated portion 3a on its face. An elongated window 3b is formed in the elevated portion 3a along its length. Through the elongated window 3b, the card 4 is insertable into the slot 2b of the card read/write device 2. A recess 3c is formed in the elevated portion 3a to provide finger access to the card 4 during insertion of the card 4 into the card reader 1 and removal of the card 4 from the card reader 1. The bezel 3 is also formed with a flange 3d having a pair of screw holes 3e in both ends.

The card reader 1 is installed inside a gaming machine. The front panel of the gaming machine is formed with a rectangular window of a size little larger than the elevated portion 3a of the bezel 3. The card reader 1 is attached to the interior of the front panel in such a manner that the elevated portion 3a projects outside of the gaming machine through the rectangular window formed in the front panel. The bezel 3 is secured to the front panel of the gaming machine by means of two screws going through the screw holes 3e. After installed inside the gaming machine, only the elevated portion 3a is visible from the outside of the gaming machine. As discussed above, since the bezel 3 is made of a black plastic that is opaque, its elevated portion 3a projecting outside of the gaming machine is hard to locate in a dimly lit light condition in a casino.

FIGS. 2, 3 and 4 show an embodiment of the present invention. In this embodiment, a card reader 10 has bezel 20 and a card read/write device 30. Like the card read/write device 2 of the conventional card reader 1, the card read/write device 30 includes a flat rectangular casing 31 having in its front surface a slot for insertion of a card into the device 30. It also includes a magnetic head 32 for reading and writing data along a magnetic strip on a card, and a control circuit 33 for controlling the card reader 10. The magnetic head 32 is positioned on the top surface of the casing 31 near the slot at a location corresponding to the lateral position of the magnetic strip on a card. The control circuit 33 is mounted on a circuit board 34 assembled on the top surface of the casing 31.

Figure 5:
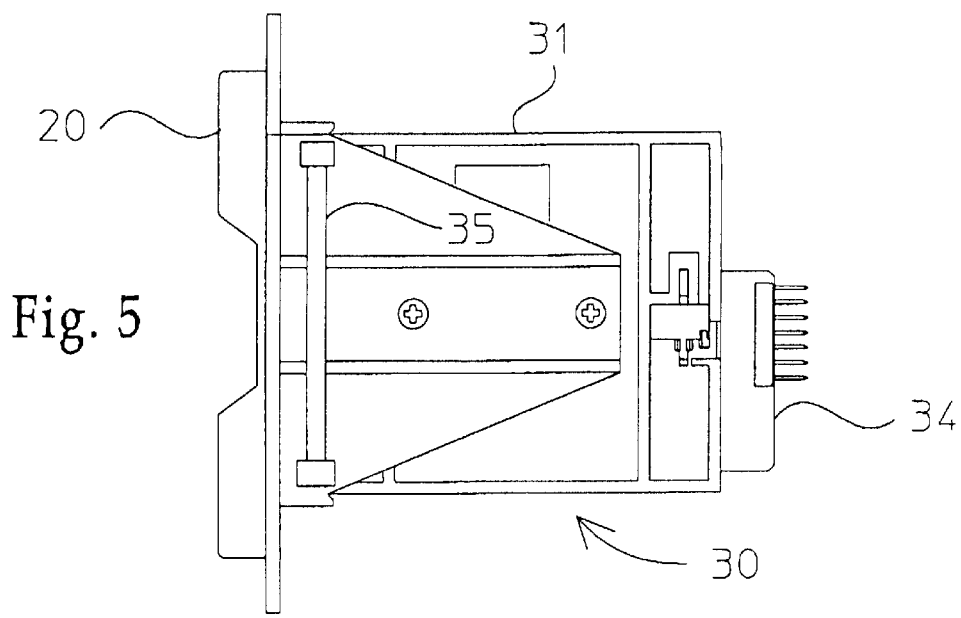
FIG. 5 is a bottom view showing a card reader of another embodiment according to the present invention.

Unlike the conventional card reader 1, however, the card reader 10 has a UV lamp 35 and a UV lamp inverter circuit 36. The UV lamp 35 is of a cylindrical shape substantially equal in length to the width of the casing 31, and attached in parallel to the rear surface of the casing 31. The UV lamp inverter circuit 36 is mounted on the top surface of the casing 31 and generates sufficiently high voltage to drive the UV lamp 35 to illuminate. Such a UV lamp and an inverter are commercially available from JKL Components Corporation, Pacoima, Calif. Please note that the UV lamp 35 may take any shape and have any length as long as it can serve the purposes of the present invention. Also, the UV lamp 35 may be positioned at a different location than shown in FIGS. 2, 3 and 4. For instance, the UV lamp 35 may be positioned near the bezel 20 on the bottom surface of the card reader as shown in FIG. 5.

Figure 6:
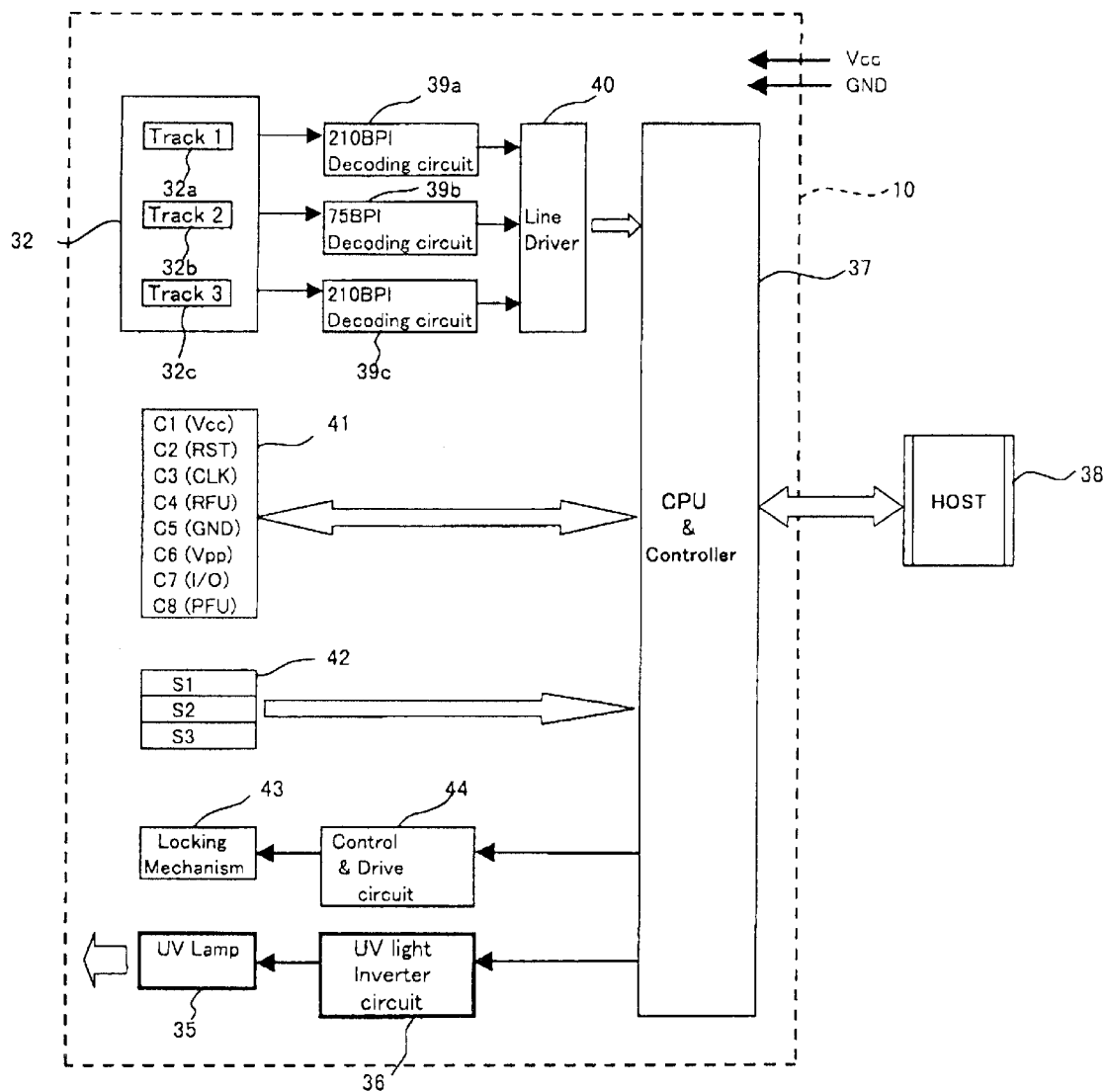
FIG. 6 is a block diagram showing a card read/write device of the card reader according to the present invention.

FIG. 6 shows a block diagram of the card read/write device 30. The card read/write device 30 has a CPU 37 that controls functions and operations of the electronic and mechanical components of the card read/write device 30. The CPU 37 also control communications with a host computer 38.

The card read/write device 30 is capable of reading and writing data on various kinds of cards. For instance, the card may be an ordinary magnetic card with a magnetic strip along which data is recorded magnetically, or an IC card that stores data electronically. The card may also be a combination of IC and magnetic cards. Ordinarily, a magnetic strip on a magnetic card has three tracks 1, 2 and 3, corresponding respectively to which the magnetic head 32 has three heads 32a, 32b and 32c. The recoding densities of these tracks may differ from one another and are usually determined at the request of a customer who is to use the card reader 10. In this embodiment, the recording densities of the tracks 1, 2 and 3 are set at 210 bits per inch (BPI), 75 BPI and 210 BPI, respectively. Data recorded on each of the tracks 1, 2 and 3 is retrieved by the corresponding heads of the magnetic head 32 and supplied to the CPU 37 through corresponding decoding circuitries 39a, 39b and 39c and a line driver 40. The card read/write device 30 is also equipped with IC card contacts collectively indicated by reference number 41. Those contacts 41 are located around the center of the bottom surface of the casing 31. Through these contacts 41, the CPU 37 reads and writes data on the IC card.

The card read/write device 30 has three card-detecting sensors 42 for detecting a location of a card inside the device 30. Each of these sensors 42 supplies to the CPU 37 information as to whether or not a card exists inside the card read/write device 30 and whether or not the card is positioned correctly inside the device 30 for the reading and writing operations. To prevent an accidental removal of the card from the card read/write device 30 during the operation of reading or writing data on the card, the card read/write device 30 has a card lock mechanism 43 that is controlled by the CPU 37 through a control & drive circuit 44. The UV lamp 35 is turned on and off by the UV lamp inverter circuit 36 under the control of the CPU 37. Ordinarily, the UV lamp is turned on when power is supplied to the card reader 10 and turned off when the power supply to the card reader 10 is shut off.

Turning now to FIGS. 7A–7E, the bezel 20 is made of a molded plastic. In this embodiment, the bezel 20 is in the same shape as the bezel 3 of the conventional card reader 1. However, the bezel 20 may take any shape as long as it can serve the purposes of the present invention. The bezel 20 has on its face a rectangular elevated portion 20a and a flange 20c surrounding the elevated portion 20a. A recess 20b is formed in the elevated portion. As shown in FIG. 7B, the elevated portion 20a is formed with generally V-shaped grooves 20d that become progressively narrower towards the bottoms where an elongated window 20e is opened through the bezel 20. The elongated window 20e is made in a shape almost exactly the same as the lateral cross section of a card in order to properly align the card being inserted with the slot of the card read/write device 30.

The elevated portion 20a has a generally hollow interior in which four contiguous walls 20f, 20g and 20h stand upright rearward (FIG. 7D) and provide a rectangular slot for the front end of the casing 31 of the card read/write device 30 to fit in. The side walls 20g restrict lateral movement of the bezel 20 relative to the device 30. The bottom wall 20h extends rearward to provide a rear structure having a trapezoidal shape. The rear structure 27h has two screw holes 20i formed therein. The bezel 20 is fixed to the card read/write device 30 in such a manner that the rear structure 20h is secured to the bottom surface of the casing 31 by means of screws going through the screw holes 20i (see FIG. 4). The rear structure 20h also has a pair of reinforcement ribs 20j running in parallel.

The bezel 20 is in the conventional shape but made of a different material. More specifically, the bezel 20 is made of a fluorescent plastic having the characteristic of absorbing UV light and emitting bright light in the visible spectrum. Due to this characteristic of the fluorescent plastic, the bezel 20 emits light when illuminated by the UV lamp 35. Such a fluorescent plastic is commercially available from LNP Engineering Plastics, Inc., Thorndale, Pa.

The card reader 10 is installed inside a gaming machine in the same manner as the conventional card reader 1 is installed. When the gaming machine is turned on, power is supplied to the card reader 10, and the CPU 37 turns on the UV lamp 35. Illuminated by UV light, the bezel 20 emits light from the elevated portion 20a projecting outside the gaming machine. The light emitted from the elevated portion 20a makes itself very conspicuous and visible. As a result, even under a dimly lit light condition in a casino, the elevated portion 20a maintains high visibility that will aid the player in inserting the player's card into the card reader 10. When the gaming machine is turned off, the power supply to the card reader 10 is cut off, and the UV lamp 35 is turned off.

When the player inserts the player's card into the card reader 10, the magnetic head 32, if the card is a magnetic card, or the IC card contacts 41, if the card is an IC card, reads an identification code recorded on the card and sends it to the CPU 37. The CPU 37 then communicates the identification code to the host computer 38. This identification code allows the host computer 40 to track the cardholder's gaming activities. More specifically, the host computer 38 has a personal account for the player maintained in relation to the identification code, and all transactions of the player with the gaming machine will be settled on the personal account maintained on the host computer 38. Thus, at each game play, the gaming machine sends the host computer 38 information on the amount the player won or lost. The host computer 38 then credits or debits the amount on the personal account maintained thereon. If the card is an IC card, the transactions may be recorded on the card itself.

The bezel 20 may be colored so that it can emit visually attractive light. In casinos, illumination of gaming machines is really important to attract players. DAY-GLO Color Corporation, Cleveland, Ohio, specializes in coloring the fluorescent plastics. The fluorescent plastic colored by DAY-GLO Color Corporation is also available from LNP Engineering Plastics, Inc, under the name of "Colorcomp D-1000." According to the experiments Applicants conducted, the colors that make the bezel 20 preferably attractive are yellow, whose product identification numbers are "YL3-559 FL TP" and "YL3-563 FL TP"; red (RD1-211-1 FL TP); and blue (BL5-625-1 FL TP).

Figure 8:
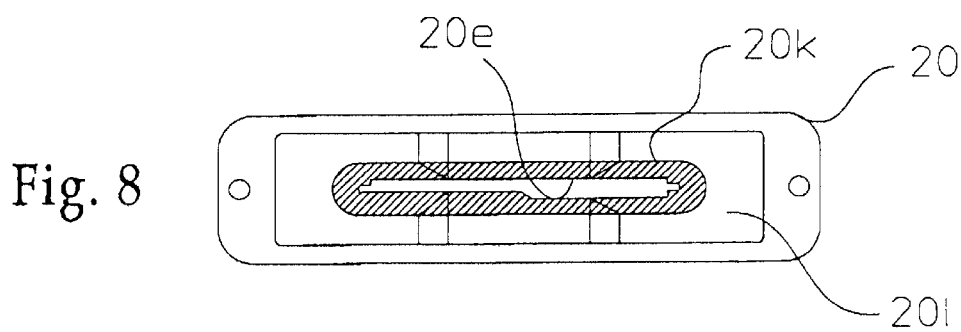
FIG. 8 is a front view showing a bezel of another embodiment according to the present invention.

The casing 31 of the card read/write device 30 may also be made of the fluorescent plastic but having a color different from that of the bezel 20. If so made, the bezel 20 and the casing 31 both emit light in different colors. As a result, the elevated portion 20a projecting outside the gaming machine emits light in the mixed colors that make it look aesthetically pleasing. The bezel 20 as such may be molded of a plurality of fluorescent plastics of different colors to impart visually pleasing coloration to the bezel 20. For instance, as shown in FIG. 8, the fluorescent plastic of one color is used to form the periphery 20k of the elongated window 20e, and the fluorescent plastic of a different color may be used to form the remaining part 201 of the bezel 20 to accentuate the window 20e.

Figure 9:
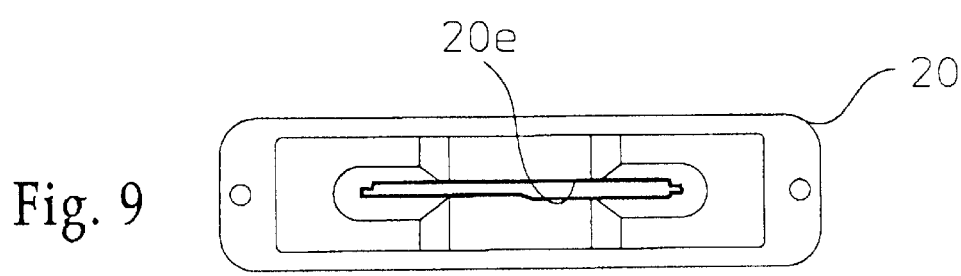
FIG. 9 is a front view showing the bezel of another embodiment according to the present invention.

If the casing 31 of the card read/write device 30 is made of the fluorescent plastic, the bezel 20 may be made of an ordinary plastic. When lit up by the UV lamp 35, the casing 31 of the card read/write device 30 emits light and illuminates the elongated window 20e of the bezel 20 from the inside of the gaming machine as shown in FIG. 9.

A special effect can be expected if the bezel 20 is made of the fluorescent plastic, and the casing 31 of the card read/write device 30 is made of an ordinary plastic that is transparent. The UV light from the UV lamp 35 goes through the transparent casing 31 and lights up the bezel 20 uniformly. Thus, the bezel 20 illuminates uniformly in its entirety. Under such a uniformly illuminating condition, when an opaque card is inserted into the card read/write device 10, the card partially blocks the UV light going through the casing 31. As a result, the bezel 20 will illuminate unevenly. The change in illumination of the bezel 20 caused by an insertion of a card will notify the player whether or not the card is fully inserted into the card reader 10.

The bezel 20 may have inner surfaces of rough finish. The rough surfaces diffuse light inside the bezel 20 and make the bezel 20 brighter and more conspicuous. The outer surface of the elevated portion 20a may be formed with small projections each having, for instance, a pyramid shape to diffuse light emitted from the elevated portion 20a.

The rear structure 20h may take any shape other than a trapezoid as shown in FIGS. 7a and 7c. Generally speaking, the larger the rear structure 20h becomes, the more UV light it receives and thus the brighter light the bezel 20 emits. The rear structure 20h may be of a rectangular shape. The rear structure 20h may also be shaped so that it covers not only the bottom surface of the casing 31 but also the side surfaces and a part of the top surface thereof.

The CPU 37 may turn the UV lamp 35 on and off in accordance with instructions from the host computer 38 so that the bezel 20 will emit visually amusing patterns of light. For instance, when the player wins a significant amount of money, the host computer 38 may instruct the CPU 37 to turn on and off the UV lamp 35 in such a pattern as to celebrate the big win. When the player is losing money, the host computer 38 may instruct the CPU 37 to turn on and off the UV lamp 35 in such a pattern as to cheer up the player.

Figure 10:
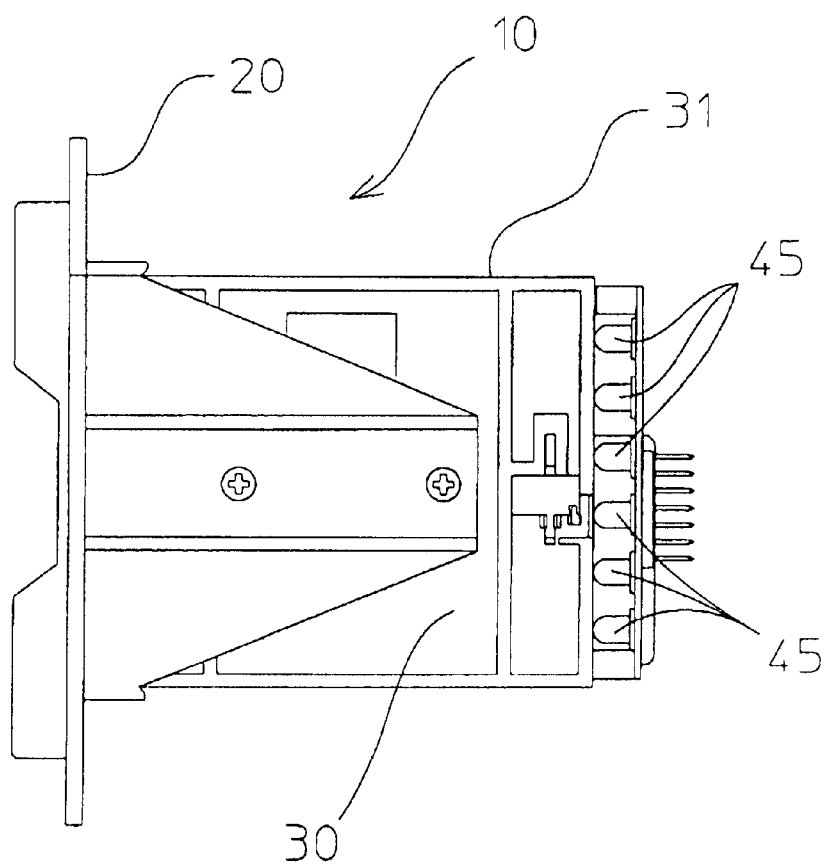
FIG. 10 is a bottom view showing a card reader of another embodiment according to the present invention.

The UV lamp 35 may be replaced with LEDs that emit visible light having a wavelength close to UV. LEDs emitting blue light are available from LUMEX, Palatine, Ill., under the name of "blue-lights." FIG. 10 shows the card reader 10 with such blue LEDs 45 arranged in line along the rear surface of the casing 31 of the card read/write device 30.

The UV lamp 35 may not be necessary. The fluorescent plastic has a characteristic of collecting ambient light and re-emitting it at the edges with high intensity. Thus, the bezel 20, without being illuminated by the UV lamp 35, collects light from a dimly lit ambience inside a casino and re-emits the collected light at the edges of the elevated portion 20a. If a casino room is lit up by a black light or UV light, the UV lamp 35 is not necessary at al. The bezel 20 absorbs the UV light in the casino room and emits light in the visible spectrum.

The bezel 20 may be made of a fluorescent plastic having a special characteristic. For instance, a special fluorescent plastic is known that has the characteristic of storing light in a bright light condition and emits the stored light in the dark. Such a special plastic is commercially available under the name of "Lumi Nova (N Yako G300 series)" from Nemoto Tokushu Kagaku K.K.

The bezel 20 may also be made of an ordinary transparent plastic if the card reader 10 has a light source emitting light in the visible spectrum. An electro luminescence (EL) film may be used as a light source. The EL film is a film that emits light when a voltage is applied. Such an EL film is commercially available from MetroMark, Minnetonka, Minn., under the name of "Elite." A special inverter is required as a power source to drive the film to illuminate. Such an inverter is available from Loctite Luminescent Systems, Inc., Lebanon, N.H. The film is applied to the rear surface of the bezel 20.

An LED may be used as a light source for illuminating the bezel 20. Although an LED emitting light in one color may of course be used, an LED capable of emitting light in multiple colors is preferable for the purpose of attracting players. Also, an arrangement is possible with such an LED in which the CPU 37 switches the colors of the individual LEDs in accordance with instructions from the host computer 38 so that the LEDs will emit visually amusing patterns of light.

The bezel 20 may contain a conductive material, such as carbon or metal fibers. The floors in casinos are usually fully carpeted. As a result, a substantial charge of static electricity can build up on players moving on the floors and cause serious damages to electronic components of gaming machines. The electrical resistance of the fluorescent plastic forming the bezel 20 is about $10^{15}$ Ω-cm. But by adding carbon or metal fibers, the electrical resistance of the bezel 20 can be lowered to $10^3$–$10^{12}$ Ω-cm, preferably to $10^9$ Ω-cm. Thus, the bezel 20 containing carbon or metal fibers safely discharges static electricity built up on the player to ground when the player's card comes in contact with the bezel 20 during the insertion of the card into the card reader 10, thereby protecting the components inside the gaming machine from being damaged by static electricity. The fluorescent plastic that contains a conductive material is also available from LNP Engineering Plastics, Inc, under the name of "Stat-Loy A-Clear."

Lastly, in the above embodiments, the card used with the card reader 10 is an ordinary magnetic card or an IC card, or a combination thereof. Generally, cards may be classified according to their physical recording characteristics, i.e., their recording media, for instance, a magnetic card or an IC card, or according to their financial characteristics, for instance, a credit card or a debit card. One of ordinary skill in the art will appreciate that regardless of how they are classified, the card reader 10 is operable with any kinds of cards, such as a smart card, a credit card or a debit card, or a combination of any of these cards.

Also, in the above embodiments, the card reader 10 is attached to a gaming machine, such as a slot machine. But one of ordinary skill in the art will appreciate that a gaming machine to which the card reader 10 can be attached is not limited to a slot machine. The gaming machine can be any type of gaming machine, such as a pachinko machine.

Although the present invention has been described with reference to particular illustrative embodiments thereof, many changes and modifications of the invention may become apparent to those skilled in the art without departing from the sprit and scope of the invention.

What is claimed is:

1. A card reader used in a dimly lit light condition, comprising:
   a card read/write device having a slot through which a card is inserted into the card read/write device; and
   a bezel having an elongated window through which the card is inserted into the slot, the bezel being made of a fluorescent plastic and attached to the card read/write device for illuminating the slot.

2. A card reader according to claim 1, wherein the fluorescent plastic has a characteristic of absorbing UV light and emitting light in a visible spectrum.

3. A card reader according to claim 2, further comprising a UV lamp for irradiating UV light to the bezel.

4. A card reader according to claim 2, further comprising at least one LED for illuminating the bezel, the at least one LED emitting visible light having a wavelength adjacent to a UV spectrum.

5. A card reader according to claim 3, wherein the card read/write device has a casing made of a transparent plastic through which the bezel is irradiated uniformly by the UV light.

6. A card reader according to claim 3, wherein the UV lamp is turned on and off so that the bezel will emit desired patterns of light.

7. A card reader according to claim 1, wherein the fluorescent plastic has a characteristic of collecting ambient light and emitting the collected light.

8. A card reader according to claim 1, wherein the fluorescent plastic has a characteristic of storing light in a bright light condition and emitting the stored light in a dark condition.

9. A card reader according to claim 1, wherein the bezel contains a conductive material that can discharge static electricity through the card to ground.

10. A card reader according to claim 1, wherein the fluorescent plastic is colored in a desired color.

11. A card reader according to claim 1, wherein the bezel is made of a plurality of fluorescent plastics of different colors to emit light in desired coloration.

12. A card reader according to claim 1, wherein the bezel has at least one surface of rough finish to diffuse light inside the bezel.

13. A card reader according to claim 1, wherein the bezel has at least one surface on which small projections are formed to diffuse light emitted from the bezel.

14. A card reader according to claim 1, wherein the bezel has a rear structure to increase an area exposed to light.

15. A card reader according to claim 1, wherein the bezel is made of the fluorescent plastic of one color, and the card read/write device has a casing made of the fluorescent plastic of a different color.

16. A card reader according to claim 1, wherein the card reader can read the card selected from the group consisting of a magnetic card, IC card, smart card, credit card and debit card.

17. A card reader used in a dimly lit light condition, comprising:
   a card read/write device having a slot through which a card is inserted into the card read/write device;
   a bezel having an elongated window through which the card is inserted into the slot, the bezel being made of a fluorescent plastic and attached to the card read/write device; and
   a light source that irradiates visible light to illuminate the slot through the bezel.

18. A card reader according to claim 17, wherein the light source is an electro luminescent film that emits light when a voltage is applied thereto, the electro luminescent film being applied to at least one rear surface of the bezel.

19. A card reader according to claim 17, wherein the light source is at least one LED capable of emitting light in different colors.

20. A card reader according to claim 19, wherein the at least one LED is switched in different colors to emit desired patterns of light.

21. A card reader according to claim 17, further comprising a UV lamp for irradiating UV light to the card read/write device, wherein the light source is the card read/write device having a casing made of a fluorescent plastic having a characteristic of absorbing the UV light and emitting light in a visible spectrum.

22. A bezel of a card reader used in a dimly lit light condition, the card reader including a card read/write device with a slot through which a card is inserted into the card read/write device, characterized in that the bezel has an elongated window through which the card is inserted into the slot and is made of a fluorescent plastic that illuminates the slot.

23. A bezel of a card reader in accordance with claim 22, wherein the fluorescent plastic has a characteristic of absorbing UV light and emitting light in a visible spectrum.

24. A bezel of a card reader in accordance with claim 22, wherein the fluorescent plastic has a characteristic of collecting ambient light and emitting the collected light.

25. A bezel of a card reader in accordance with claim 22, wherein the fluorescent plastic has a characteristic of storing light in a bright light condition and emitting the stored light in a dark condition.

26. A bezel of a card reader in accordance with claim 22, wherein the fluorescent plastic contains a conductive material that can discharge static electricity through the card to ground.

27. A bezel of a card reader in accordance with claim 22, wherein the fluorescent plastic is colored in a desired color.

28. A bezel of a card reader in accordance with claim 22, wherein the bezel is made of a plurality of fluorescent plastics of different colors to emit light in desired coloration.

29. A bezel of a card reader in accordance with claim 22, wherein the bezel has at least one surface of rough finish to diffuse light inside the bezel.

30. A bezel of a card reader in accordance with claim 22, wherein the bezel has at least one surface on which small projections are formed to diffuse light emitted from the bezel.

31. A bezel of a card reader in accordance with claim 22, wherein the bezel has a rear structure to increase an area exposed to light.

32. A method of illuminating a slot of a card read/write device in order to aid an insertion of a card into the slot in a dimly lit light condition, comprising the steps of:
   providing a bezel being made of a fluorescent plastic and having an elongated window;
   attaching the bezel to the card read/write device adjacent to the slot so that the card is inserted into the slot through the elongated window of the bezel; and
   illuminating the slot through the bezel.

33. A method in accordance with claim 32, wherein the fluorescent plastic has a characteristic of absorbing UV light and emitting light in a visible spectrum.

34. A method in accordance with claim 33, further comprising the step of irradiating UV light to the bezel.

35. A method in accordance with claim 33, further comprising the step of illuminating the bezel by at least one LED that emits visible light having a wavelength adjacent to a UV spectrum.

36. A method in accordance with claim 34, further comprising the step of turning on and off irradiation of the UV light to the bezel so that the bezel will emit desired patterns of light.

37. A method in accordance with claim 32, wherein the fluorescent plastic has a characteristic of collecting ambient light and emitting the collected light.

38. A method in accordance with claim 32, wherein the fluorescent plastic has a characteristic of storing light in a bright light condition and emitting the stored light in a dark condition.

39. A method in accordance with claim 32, wherein the fluorescent plastic is colored in a desired color.

40. A method in accordance with claim 32, wherein the fluorescent plastic is colored in one color and the card read/write device has a casing made of the fluorescent plastic of a different color.

41. A method in accordance with claim 32, wherein the bezel is made of a plurality of fluorescent plastics of different colors to emit light in desired coloration.

42. A method in accordance with claim 32, wherein the bezel has at least one surface of rough finish to diffuse light inside the bezel.

43. A method in accordance with claim 32, wherein the bezel has at least one surface on which small projections are formed to diffuse light emitted from the bezel.

44. A method in accordance with claim 32, wherein the bezel has a rear structure to increase an area exposed to light.

45. A method in accordance with claim 32, wherein the bezel includes an electro luminescent film applied thereto that emits light when a voltage is applied thereto.

46. A method in accordance with claim 32, further comprising the step of illuminating the bezel with at least one LED capable of emitting light in different colors.

47. A method in accordance with claim 46, further comprising the step of switching the at least one LED in different colors to emit desired patterns of light.

48. A method in accordance with claim 32, wherein the card read/write device has a casing made of a fluorescent plastic having a characteristics of absorbing UV light and emitting light in a visible spectrum, and further comprising the step of irradiating UV light to the casing to cause the casing to emit light, which comes out from the elongated window and highlights the slot.

49. A gaming machine being operated in a dimly lit light condition, comprising:
   a card read/write device installed inside the gaming machine and having a slot through which a card is inserted into the card read/write device; and
   a bezel for illuminating the slot, the bezel being made of a fluorescent plastic and attached to the card read/write device for visibility outside the gaming machine, the bezel having an elongated window through which the card is inserted into the slot.

50. A gaming machine according to claim 49, wherein the fluorescent plastic has a characteristic of absorbing the UV light and emitting light in a visible spectrum.

51. A gaming machine according to claim 50, further comprising a UV lamp for irradiating UV light to the bezel.

52. A gaming machine according to claim 50, further comprising at least one LED for illuminating the bezel, the at least one LED emitting visible light having a wavelength adjacent to a UV spectrum.

53. A gaming machine according to claim 57, wherein the card read/write device has a casing made of a transparent plastic through which the bezel is irradiated uniformly by the UV light.

54. A gaming machine according to claim 51, wherein the UV lamp is turned on and off so that the bezel will emit desired patterns of light.

55. A gaming machine according to claim 49, wherein the fluorescent plastic has a characteristic of collecting ambient light and emitting the collected light.

56. A gaming machine according to claim 49, wherein the fluorescent plastic has a characteristic of storing light in a bright light condition and emitting the stored light in a dark condition.

57. A gaming machine according to claim 49, wherein the bezel contains a conductive material that can discharge static electricity through the card to ground to protect electronic components of the card read/write device and the gaming machine from being damaged by the static electricity.

58. A gaming machine according to claim 49, wherein the fluorescent plastic is colored in a desired color.

59. A gaming machine according to claim 49, wherein the bezel is made of the fluorescent plastic of one color, and the card read/write device has a casing made of the fluorescent plastic of a different color.

60. A gaming machine according to claim 49, wherein the bezel is made of a plurality of fluorescent plastics of different colors to emit light in desired coloration.

61. A gaming machine according to claim 49, wherein the bezel has at least one surface of rough finish to diffuse light inside the bezel.

62. A gaming machine according to claim 49, wherein the bezel has at least one surface on which small projections are formed to diffuse light emitted from the bezel.

63. A gaming machine according to claim 49, wherein the bezel has a rear structure to increase an area exposed to light.

64. A gaming machine according to claim 49, wherein the card read/write device can read the card selected from the group consisting of a magnetic card, IC card, smart card, credit card and debit card.

65. A gaming machine being operated in a dimly lit light condition, comprising:

a card read/write device installed inside the gaming machine and having a slot through which a card is inserted into the card read/write device;

a bezel being made of a fluorescent plastic and attached to the card read/write device for visibility outside the gaming machine, the bezel having an elongated window through which the card is inserted into the slot; and a light source that irradiates visible light to illuminate the slot through the bezel.

66. A gaming machine according to claim 65, wherein the light source is an electro luminescent film that emits light when a voltage is applied thereto, the electro luminescent film being applied to at least one rear surface of the bezel.

67. A gaming machine according to claim 65, wherein the light source is at least one LED capable of emitting light in different colors.

68. A gaming machine according to claim 67, wherein the at least one LED is switched in different colors to emit desired patterns of light.

69. A gaming machine according to claim 65, further comprising a UV lamp for irradiating UV light to the card read/write device, wherein the light source is the card read/write device having a casing made of a fluorescent plastic having a characteristic of absorbing the UV light and emitting light in a visible spectrum.

* * * * *

UNITED STATES PATENT AND TRADEMARK OFFICE
CERTIFICATE OF CORRECTION

PATENT NO. : 6,641,034 B1
DATED : November 4, 2003
INVENTOR(S) : Hajime Oki et al.

It is certified that error appears in the above-identified patent and that said Letters Patent is hereby corrected as shown below:

Column 11,
Line 10, delete "claim 57," and substitute -- claim 51,-- in its place.

Signed and Sealed this

Seventeenth Day of August, 2004

JON W. DUDAS
*Acting Director of the United States Patent and Trademark Office*